US006392213B1

(12) United States Patent
Martorana et al.

(10) Patent No.: US 6,392,213 B1
(45) Date of Patent: May 21, 2002

(54) FLYER ASSEMBLY

(75) Inventors: Richard T. Martorana, Andover; Jamie Anderson, Watertown; Simon Mark Spearing, Newton; Seth Kessler, Cambridge; Brent Appleby, Holliston; Edward Bergmann, Hopkinton; Sean George, Boston; Steven Jacobson, Shrewsbury; Donald Fyler, Needham; Mark Drela, Cambridge; Gregory Kirkos, Somerville; William McFarland, Jr., Watertown, all of MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 09/690,000

(22) Filed: Oct. 12, 2000

(51) Int. Cl.⁷ .................................................. B64C 3/51
(52) U.S. Cl. ...................... 244/3.1; 244/3.24; 244/13; 244/49; 89/1.816
(58) Field of Search ................................ 244/3.1, 3.11, 244/3.15, 3.21, 3.24–3.3, 36, 49; 102/348, 501, 503, 380, 206; 89/1.809, 1.81, 1.815, 1.816, 1.819

(56) References Cited

U.S. PATENT DOCUMENTS

| | | | | |
|---|---|---|---|---|
| 3,695,555 A | * | 10/1972 | Chadwick | 244/3.14 |
| 4,240,601 A | * | 12/1980 | Reed | 244/160 |
| 4,296,894 A | | 10/1981 | Schnabele et al. | 244/3.27 |
| 4,410,151 A | | 10/1983 | Hoppner et al. | 244/63 |
| 4,752,052 A | | 6/1988 | Galvin | 244/3.29 |
| 5,456,427 A | * | 10/1995 | Greenhalgh | 244/138 R |
| 5,467,681 A | * | 11/1995 | Liberman | 244/301 |
| 6,000,340 A | * | 12/1999 | Small | 102/380 |
| 6,119,976 A | * | 9/2000 | Rogers | 244/13 |
| 6,144,899 A | * | 11/2000 | Babb et al. | 701/3 |
| 6,179,248 B1 | * | 1/2001 | Putman et al. | 244/36 |
| 6,260,797 B1 | * | 7/2001 | Palmer | 244/49 |

OTHER PUBLICATIONS

Carl Dietrich, On line Resume, Feb. 5, 1997 (WASP II Project summer 1998).*

* cited by examiner

Primary Examiner—Galen L. Barefoot
(74) Attorney, Agent, or Firm—McDermott, Will & Emery

(57) ABSTRACT

A flyer assembly is adapted for launching with, transit in, and deployment from an artillery shell having a central void region extending along a ballistic shell axis. The flyer assembly includes a jettisonable shroud and a flyer. The shroud extends along a shroud axis, and is positionable within the central void region with the shroud axis substantially parallel to the shell axis. The flyer is adapted to withstand a launch acceleration force along a flyer axis when in a first state, and to effect aerodynamic flight when in a second state. When in the first state, the flyer is positionable within the shroud with the flyer axis parallel to the shroud axis and the shell axis. The flyer includes a body member disposed about the flyer axis, and a foldable wing assembly mounted to the body member. The wing assembly is configurable in a folded state characterized by a plurality of nested wing segments when the flyer is in the first state. The wing assembly is configurable in an unfolded state characterized by a substantially uninterrupted aerodynamic surface when the flyer is in the second state. The flyer assembly is adapted to be launched from a ballistic delivery system such as an artillery cannon, and can thus reach a target quickly, without expending system energy stored within the flyer. During launch, the flyer is coupled to the shroud so as to maintain a portion of the flyer in tension during an acceleration of the flyer along the flyer axis resulting from the launch. The flyer assembly is adapted to withstand the high g-load and high temperature environments of a cannon launch, and can tolerate a set-back g load of about 16,000 g.

29 Claims, 13 Drawing Sheets

FLYER ASSEMBLY

CROSS-REFERENCE TO RELATED APPLICATIONS

Not Applicable.

REFERENCE TO MICROFICHE APPENDIX

Not Applicable.

FIELD OF THE INVENTION

The present invention relates generally to flyer assemblies, and more particularly to flyer assemblies adapted to be launched from artillery cannons for surveillance and other time-critical missions.

BACKGROUND OF THE INVENTION

Reconnaissance and surveillance missions are used in military as well as civilian operations in order to identify and evaluate potential targets, and to provide target information as needed. For example, in a military operation, surveillance missions can provide timely information about moving military targets in air, land or sea, or can provide battle damage assessment, following a sortie. They can also identify nontargets such as refugees.

For time-critical moving targets, it is necessary that tactical observational tools be able to provide identification and/or imaging of the targets within the fastest response time possible. Prior art unmanned air vehicles (UAVs) suffer, however, from a slow response time and in many cases are not able to reach areas of interest as fast as required by the mission.

It is time consuming and difficult to launch, operate and transport prior art UAVs. Special troops and facilities are needed to launch, transport, and in some situations recover prior art UAVs. Generally, a specialized platoon is required in order to launch prior art UAVs. Most prior art UAVs are launched like traditional aircraft from the ground, either with runways or with variants such as rails, sling-shots or similar devices. This requires flat land in a safe terrain, as well as significant set-up and support time. The UAV must also be fueled, which takes up additional time. There is considerable risk involved in transporting observational tools such as UAVs to locations that will provide the most valuable observational information, because of the probability that the tool will be detected, intercepted and/or destroyed by hostile forces.

Prior art UAVs require special storage, shipping, and handling, since prior art UAVs are stored as aircraft, requiring maintenance after use. Often a vehicle, such as a HUMVEE, is required for launch, flight support, or both. Finally, prior art UAVs are expensive to build and maintain, which constrains their numbers. Cost is not limited to the hardware of the UAVs, but additional cost is involved in training and maintaining the support troops.

Prior art UAVs use their own fuel or some other type of own system energy to fly to the area of interest. Using system energy for travel reduces the energy available for endurance or functionality when the UAV is in an overhead position with respect to the target. The sizes and locations of the areas to which UAVs can be sent are limited by such a reduction in available energy.

Ballistically launching the UAV to the desired location would avoid the problems described above. Ballistic launching would greatly improve response time. Ballistic launching would also obviate the need to expend system energy of the UAV until the UAV is near the target, thereby maximizing the energy available to the UAV for endurance or functionality. Greater flexibility would be available for the sizes and locations of the areas to which the UAVs can be sent. Existing tactical UAVs are not, however, constructed to survive the high g-forces that develop during a ballistic launch.

It is an object of this invention to overcome the above described disadvantages of prior art flyers.

SUMMARY OF THE INVENTION

The present invention features a flyer assembly adapted for launching with, transit in, and deployment from an artillery shell having a central void region extending along a ballistic shell axis. The flyer assembly includes a jettisonable shroud, and a flyer. The shroud extends along a shroud axis, and is positionable within the central void region of the artillery shell, with the shroud axis substantially parallel to the shell axis. The flyer is adapted, when in a first state, to withstand a launch acceleration force along a flyer axis. In the first state, the flyer is positionable within the shroud with the flyer axis parallel to the shroud axis and the shell axis. The flyer is adapted, when in a second state, to effect aerodynamic flight. The flyer may be an unmanned air vehicle.

The flyer includes a body member disposed about the flyer axis, and a foldable wing assembly mounted to the body member. The wing assembly is configurable in a folded state characterized by a plurality of nested wing segments when the flyer is in the first state. The wing assembly is configurable in an unfolded state characterized by a substantially uninterrupted aerodynamic surface when the flyer is in the second state. When the wing assembly is in the folded state, a span-wise axis of each wing segment is substantially parallel to the flyer axis. When the wing assembly is in the unfolded state, the span-wise axis of each wing segment is substantially transverse to the flyer axis. In one embodiment, the flyer further includes a foldable tail assembly mounted to the body member.

The flyer is adapted to be coupled to the shroud so as to maintain a portion of the flyer in tension during an acceleration of the flyer along the flyer axis resulting from the launch acceleration force. In one embodiment, the shroud includes a support mechanism disposed at an interior surface of the shroud. The flyer includes a bulkhead for coupling to the support mechanism of the shroud. The flyer can be hung by the bulkhead on the support mechanism of the shroud, thereby maintaining a portion of the flyer in tension and preventing buckling. In one embodiment, the support mechanism is a hanger. In one embodiment, the body member of the flyer includes a nose section, a mid-body section, and a tail section. Bulkheads are disposed at the junctions between the nose section and the mid-body section, and between the mid-body and the tail section. The mid-body section and the tail section of the flyer are maintained in tension during an acceleration of the flyer along the axis resulting from the launch.

The flyer is adapted to survive the high-g and high temperature environments of a cannon launch. In a preferred form, the flyer is adapted to withstand a set-back acceleration of about 16,000 g along the flyer axis. In one embodiment, the flyer is constructed from a composite material. Because the flyer is launched by a ballistic delivery system, the flyer is operable to reach a predetermined ballistic range at a predetermined average ground speed without expending system energy stored within the flyer. In one embodiment, the predetermined ballistic range is about 22 km, and the predetermined average ground speed is about 22 km/min.

In one embodiment, the body member of the flyer includes a central void region, and the wing assembly is mounted on an outer surface of the body member exterior to the central void region. The central void region is adapted to store system energy to be dispensed during an aerodynamic flight of the flyer.

In one embodiment, the flyer assembly is adapted for expulsion from the artillery shell after reaching a predetermined ballistic range. The weight of the shroud adds to a weight of the flyer so as to provide an optimal ballistic range for the flyer assembly. In one embodiment, the optimal ballistic range is about 22 km. In one embodiment, the flyer assembly comprises a mechanism for decelerating and de-spinning the flyer assembly subsequent to an expulsion of the flyer assembly from the shell. In one embodiment, the deceleration mechanism includes a parachute. The deceleration mechanism may include a two-stage parachute.

The shroud protects the flyer during the gun launch, and during the expulsion from the shell. The shroud also protects the flyer during spinning of the flyer assembly after the expulsion. In one embodiment, during an acceleration of the flyer along the flyer axis resulting from the launch, an outermost one of the plurality of wing segments is placed under compression, and all but the outermost one of the plurality of wing segments is placed under tension. An inner surface of the shroud abuts an outermost one of the plurality of wing segments of the foldable wing assembly, and provides a radial restraining force that counters a centrifugal force arising from a spinning of the flyer assembly, thereby preventing a buckling of one or more of the plurality of wing segments.

The shroud includes a separation mechanism for jettisoning the shroud subsequent to the expulsion of the flyer assembly from the shell and upon a reaching of the expelled flyer assembly of a predetermined altitude. In one embodiment, the separation mechanism includes charges embedded within the shroud. The shroud may be substantially cylindrical.

The present invention also features a method for deploying a flyer. The method includes positioning the flyer within a jettisonable shroud so that an axis of the flyer is parallel to an axis of the shroud. The method includes positioning the shroud within a central void region in an artillery shell so that the shroud axis is parallel to a ballistic shell axis. The method includes launching the shell from a ballistic delivery assembly. The method includes expelling the shroud and the flyer from the shell. The method further includes deploying the flyer so as to configure in an unfolded state a foldable wing assembly mounted to a body member of the flyer. The step of deploying the flyer may include the step of configuring in an unfolded state a foldable tail assembly mounted to a body member of the flyer.

The method further includes the steps of decelerating and de-spinning the shroud and the flyer after expelling the shroud and the enclosed flyer from the shell. The steps of decelerating and de-spinning the shroud and the flyer may include the step of deploying a parachute. The method may include the step of separating the shroud from the flyer after expelling the shroud and the flyer from the shell.

DETAILED DESCRIPTION

Figure 1A:
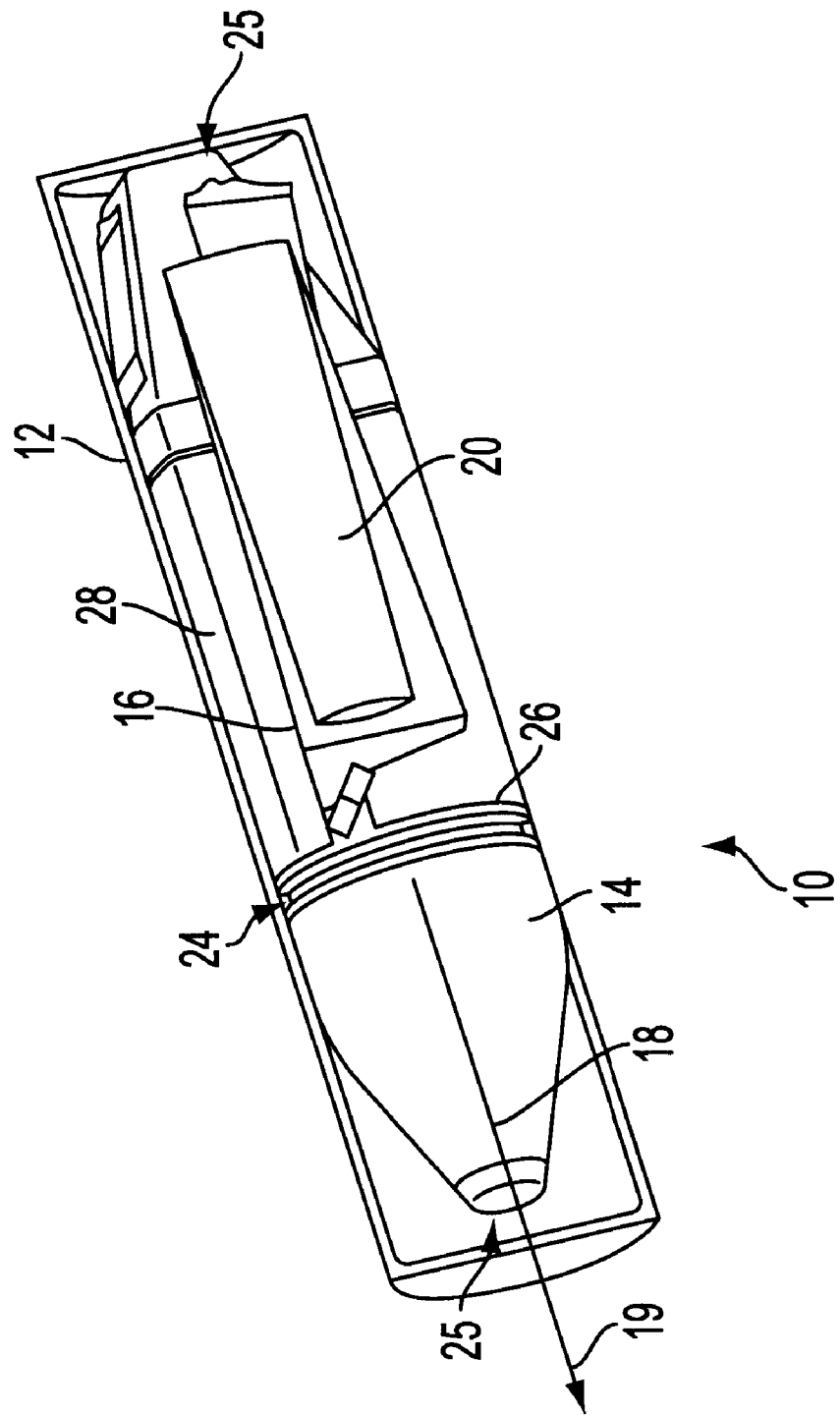
FIG. 1(a) illustrates a flyer assembly, including a shroud and a flyer enclosed within the shroud.

FIG. 1(a) illustrates one embodiment of a flyer assembly 10 constructed according to the present invention. In overview, the flyer assembly 10 includes a jettisonable shroud 12 and a flyer 14. The flyer 14 is designed to withstand an acceleration force along a flyer axis 18 when in a first, undeployed state, and to effect aerodynamic flight when in a second, deployed state. The flyer 14 includes a body member 16 disposed about the flyer axis 18, and a foldable wing assembly 20 mounted to the body member 16. When the flyer 14 is in the first state, the wing assembly 20 is in a folded state. When the wing assembly 20 is in the folded state, the flyer 14 can be positioned within the shroud 12 with the flyer axis 18 parallel to a shroud axis 19, as shown in FIG. 1(a). In one embodiment, the flyer 14 is a Wide Area Surveillance Projectile (WASP), namely a small UAV used for reconnaissance, surveillance, or other sensing missions.

Figure 1B:
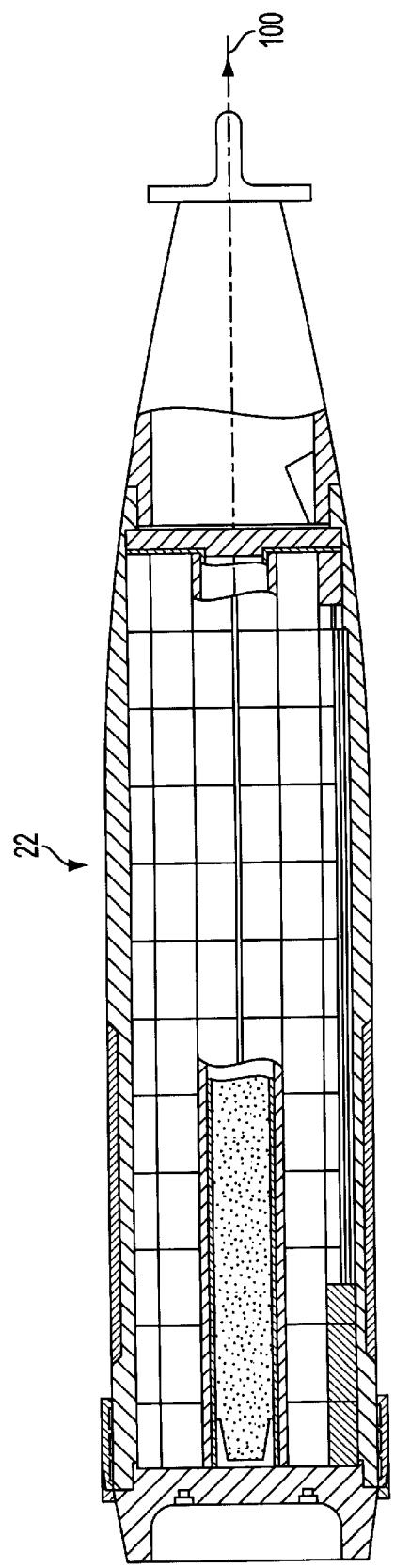
FIG. 1(b) illustrates an artillery shell into which a flyer assembly according to the present invention can be loaded for launching by a ballistic launch assembly.

The flyer assembly 10 can be loaded as a cargo in a standard 155 artillery shell 22, such as the Army M-483 cargo round shown in FIG. 1(b). The flyer assembly is adapted for launching with, transit in, and deployment from the artillery shell 22, which has a central void region extending along a ballistic shell axis 100. The flyer assembly may be stowed in the cargo bay of the M-483, and can be loaded in artillery cannons just like a normal round of cargo. The jettisonable shroud 12 extends along the shroud axis 19, and is positionable within the central void region with the shroud axis 19 substantially parallel to the shell axis 100. The flyer assembly 10 can be launched from ballistic launch systems such as artillery cannons, and can thus reach an area of interest very quickly without using its own stored fuel. The flyer assembly 10 can be launched by unspecialized 155-mm artillery troops. After reaching a predetermined ballistic range, the flyer assembly 10 is expelled from the artillery shell 22. The shroud 12 is then jettisoned, and the flyer 14 unfolds from the shroud 12 into a fully deployed UAV that can carry out reconnaissance or similar sensing missions. The flyer 14 is designed with a stress mitigation approach and a g-hardening strategy that enable the flyer 14 to withstand severe gun-launch, expulsion, and deployment environments.

The shroud 12 is a rugged, multi-functional canister. In one embodiment, the shroud 12 has a substantially cylindrical shape, so as to be positionable within a central void region of the artillery shell 22. The shroud 12 must be heavy, if used in an application where the flyer 14 is launched from a gun. The shroud 12 is designed to protect the flyer 14 during gun launch from the harsh gun environments that includes high temperatures and high g-loads. The shroud 12 also protects the flyer 14 during expulsion from the artillery shell 22. The shroud 12 is preferably made of high-strength steel, in order to avoid buckling during set-back acceleration, and to endure high temperatures. In one embodiment, the shroud 12 is preferably made of steel having a hardness of about 4140 H, and capable of enduring a temperature of 500° F.

The present invention implements a g-hardening strategy for the flyer 14, by hanging the flyer 14 inside the shroud 12 so as to maintain most of the flyer 14 in tension during set-back acceleration. For this purpose, a support mechanism 24 is disposed at an interior surface of the shroud 12. In one embodiment, the support mechanism 24 is a hanger, such as a supporting ring or shelf. The body member 16 of the flyer 14 includes a load-bearing bulkhead 26, such as an attachment ring. In one embodiment, the bulkhead 26 is disposed near the center of gravity of the flyer 14. A substantial portion of the flyer 14 of the present invention is maintained in tension, by hanging the flyer 14 by its bulkhead 26 on the support mechanism 24 of the shroud 12. The structures of the flyer 14 located aft of the bulkhead 26 are thereby maintained in tension. Because the flyer 14 is hung within the shroud 12, there are gaps 25 between the outer end surfaces of the flyer 14 and the inner end surfaces of the shroud 12, as shown in FIG. 1(a). During set-back acceleration the front end of the flyer assembly 10, as well as the outer wall of the shroud 12, are in compression, while the flyer 14 is in tension aft of its center of gravity. In this way, the flyer 14 is protected from buckling under the compression created by the set-back acceleration.

The flyer 14 is preferably constructed from light weight composite materials, which are well adapted to withstand tension, but not necessarily well adapted to withstand compression. Composite materials have a high strength-to-weight ratio, which helps maintain the tensile strength of the flyer 14. The carbon fibers within the composite materials are oriented so that structures of the flyer 14 in the load path are made strong in the loaded direction. Many carbon-based composites known in the art may be used, including but not limited to unidirectional, woven-conformable and chopped mixture approaches. For a given propulsion system, the lighter the flyer 14, the easier it is for the flyer 14 to fly, since less propulsive power is needed in order for the flyer 14 to remain airborne. The use of light weight composite materials advantageously reduces the weight of the flyer 14. In the illustrated embodiment, the maximum flyer weight is 8.6 lbs. Also, reducing the weight of the flyer 14 reduces the g-load on the flyer 14, since each pound of weight of the flyer 14 bears a pound force equal in numerical value to the g-load on the flyer 14. In one form, the flyer 14 is designed to endure a temperature of 300° F.

Figure 2:
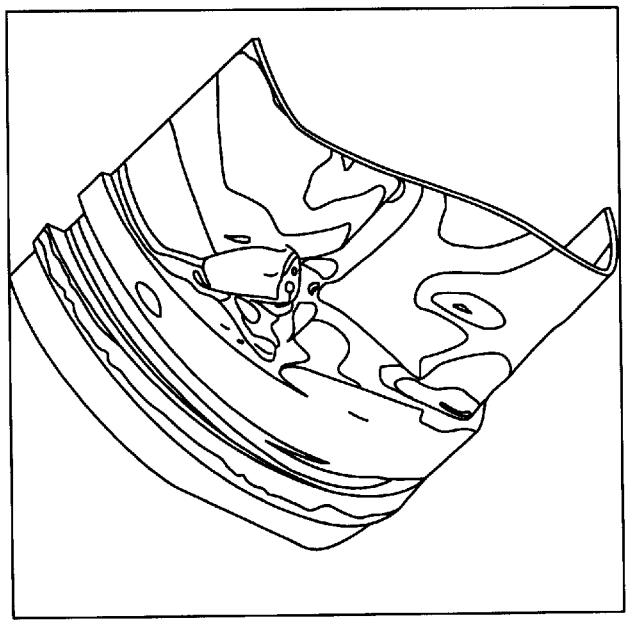
FIG. 2 illustrates a bulkhead disposed on the body member of the flyer for coupling the flyer to the shroud.
Figure 2:
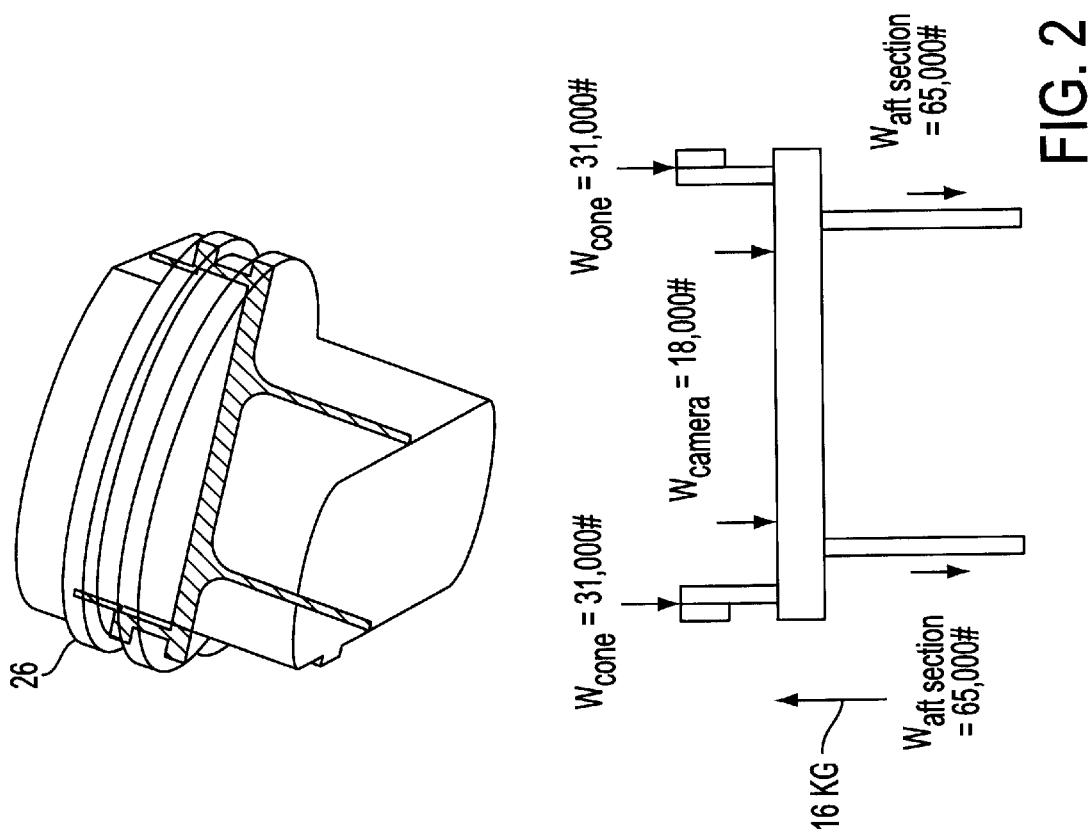

FIG. 2 illustrates one embodiment of a bulkhead 26 that provides a load path into the shroud 12. The shroud 12 provides an ultimate load path for the acceleration force, by coupling to the flyer 14 through the bulkhead 26. With this configuration, the shroud 12 mitigates the g-load on the flyer 14 during the launch. The shroud 12 thus functions as a sabot to support the flyer 14 in the high-g environment created during a gun launch. In the illustrated embodiment, the weight during peak acceleration of the aft sections of the flyer 14 is about 65,000 lb. As shown in FIG. 2, the flyer assembly 10 is adapted to survive a g-load of up to about 16,000 g. The flyer assembly 10 is unique among existing flyers and UAVs in its capability to survive such a high g-load.

The shroud 12 also serves as a convenient container for transporting and handling the flyer 14. One advantage of the flyer assembly 10 over prior art UAVs is ease of handling and transportation. Prior art UAVs are inherently unwieldy and cumbersome to transport, and require that the wings first be removed, and subsequently reattached at the launch site. In contrast, the flyer 14 of the present invention can be easily stowed inside and packaged within the shroud 12 for transportation and handling.

In a preferred embodiment, the body member 16 includes a central void region 28 within the body member 16. The wing assembly 20 is mounted exclusively on the outer surface of the body member 16, exterior to the central void region 28. This configuration permits use of the space within the body member 16, in contrast to prior art flyers in which the wing assembly 20 when in the folded state uses up all available space in the body member 16 of the flyer 14, severely reducing any storage space within the body member 16. In one embodiment, the void region 28 may be used for storage of system energy, i.e. fuel or battery, that is dispensed during an aerodynamic flight of the flyer 14.

Figure 3B:
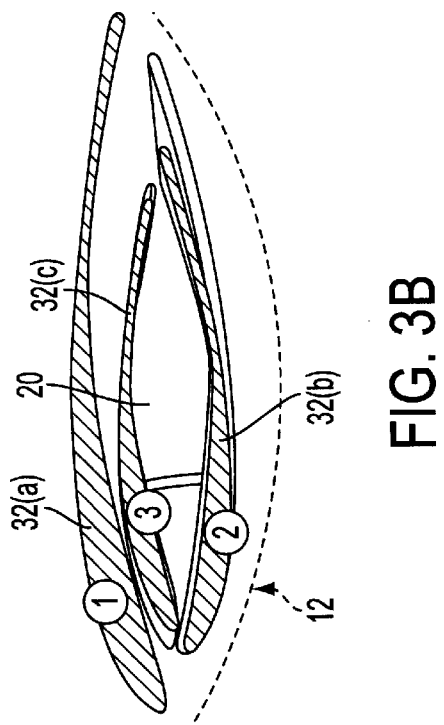
FIG. 3(b) illustrates a wing assembly configured in a folded state characterized by a plurality of nested wing segments.
Figure 3A:
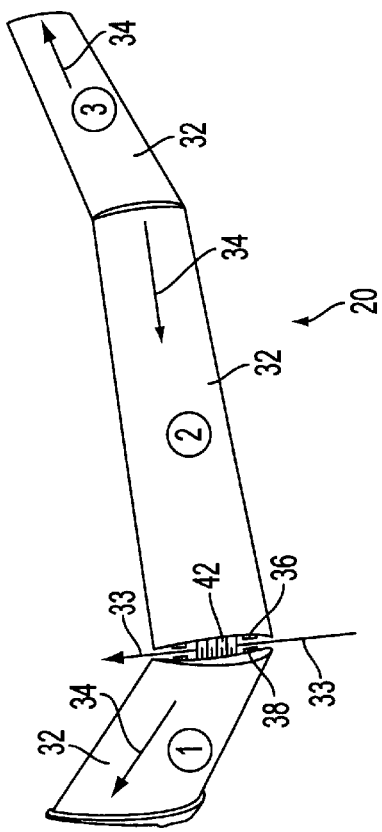
FIG. 3(a) illustrates one embodiment of a foldable wing assembly for a flyer constructed according to the present invention.

FIG. 3(a) illustrates one embodiment of a foldable wing assembly 20 for the flyer 14. The wing assembly 20 is designed to be part of the stress mitigation strategy for the flyer assembly 10. The wing assembly 20 includes at least two wing segments 32. The illustrated embodiment includes three wing segments. Each wing segment 32 has a span-wise axis 34. The wing segments 32 are disposed mutually adjacent and end to end.

In the illustrated embodiment, a pivot assembly 36 is attached to each pair of adjacent wing segments 32 and at an end of each adjacent wing segment along the span-wise axis 34. The pivot assemblies 36 may include hinges 38 provided at the junction between each pair of wing segments 32. The hinges 38 may include torsion springs 42 which provide a torque that causes an angular rotation of each pair of adjacent wing segments 32 with respect to one another about an articulation axis 33, so that the wing assembly 20 converts from a folded configuration to an unfolded or deployed configuration. Torsion springs 42 may act in combination with gravity to effect wing deployment.

FIG. 3(b) illustrates a wing assembly 20 configured in a folded state characterized by a plurality of nested wing segments 32. The wing segments 32 are designed to withstand a stress along the flyer axis of the flyer 14. When the wing assembly 20 is in a folded state and the flyer 14 is enclosed within the shroud 12, the planar surfaces of the wing segments 32 are substantially parallel to the flyer axis 18 of the flyer 14. In the embodiment illustrated in FIG. 3(b), the wing segments 32 are folded so that the middle wing segment 32(b) abuts an inner surface of the shroud 12, thereby becoming the outermost wing segment. During setback acceleration, the outermost one 32(b) of the wing segments are under compression, while the other wing segments 32(*a*) and 32(*c*) are under tension. Any buckling of one or more of the wing segments 32 is supported by the shroud 12, which provides a radial restraining force against the wing segments 32 so as to counter the centrifugal force arising from a spinning of the flyer assembly 10 after expulsion from the artillery shell 22.

Figure 4:
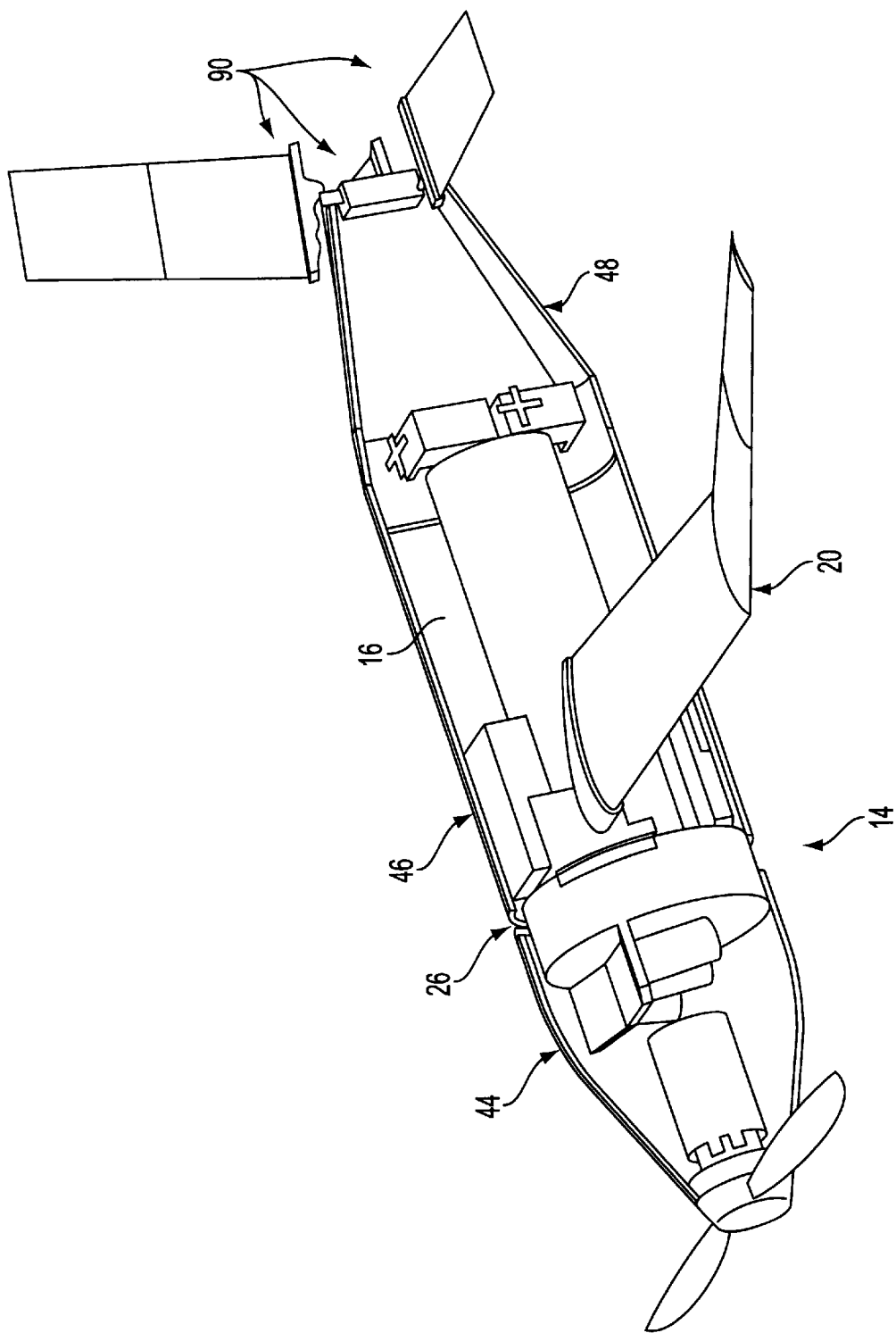
FIG. 4 illustrates a fully deployed flyer, in which the wing assembly is configured in an unfolded state.

FIG. 4 illustrates a fully deployed flyer 14 in which the wing assembly 20 is configured in an unfolded state characterized by a substantially uninterrupted aerodynamic surface. The fully deployed flyer 14 is capable of sustaining aerodynamic flight. The flyer 14 of the present invention uses the energy of an existing external delivery system in order to reach an area of interest very quickly without expending its own fuel. The flyer 14 of the present invention thus provides an important tactical advantage over prior art UAVs, by maximizing the energy available over the target, and thereby improving endurance and functionality. In one embodiment, flyer endurance is at minimum 30 minutes of continuous flight after full deployment of the flyer 14. Prior art UAVs that are launched in a traditional way must expend their own stored energy, whether in the form of gasoline or battery, in order to reach the target. Prior art UAVs must thus give up a substantial portion of their stored energy before reaching the target, and therefore cannot maximize use of the energy available over the target. In contrast, the flyer 14 according to the present invention uses its stored energy only after reaching the target area of interest and while carrying out its surveillance or other mission. The flyer 14 thereby significantly increases flight endurance, and reduces time of flight to the target.

In the embodiment illustrated in FIG. 4, the body member 16 of the flyer 14 comprises a nose section 44, a mid-body section 46, and a tail section 48. In this embodiment, the forward bulkhead 26 is disposed at a junction between the nose section 44 and the mid-body section 46. In one embodiment, the body member 16 has a length of about 19.5 inches, and has a diameter of about 4.6 inches at the nose section 44.

Figure 5:
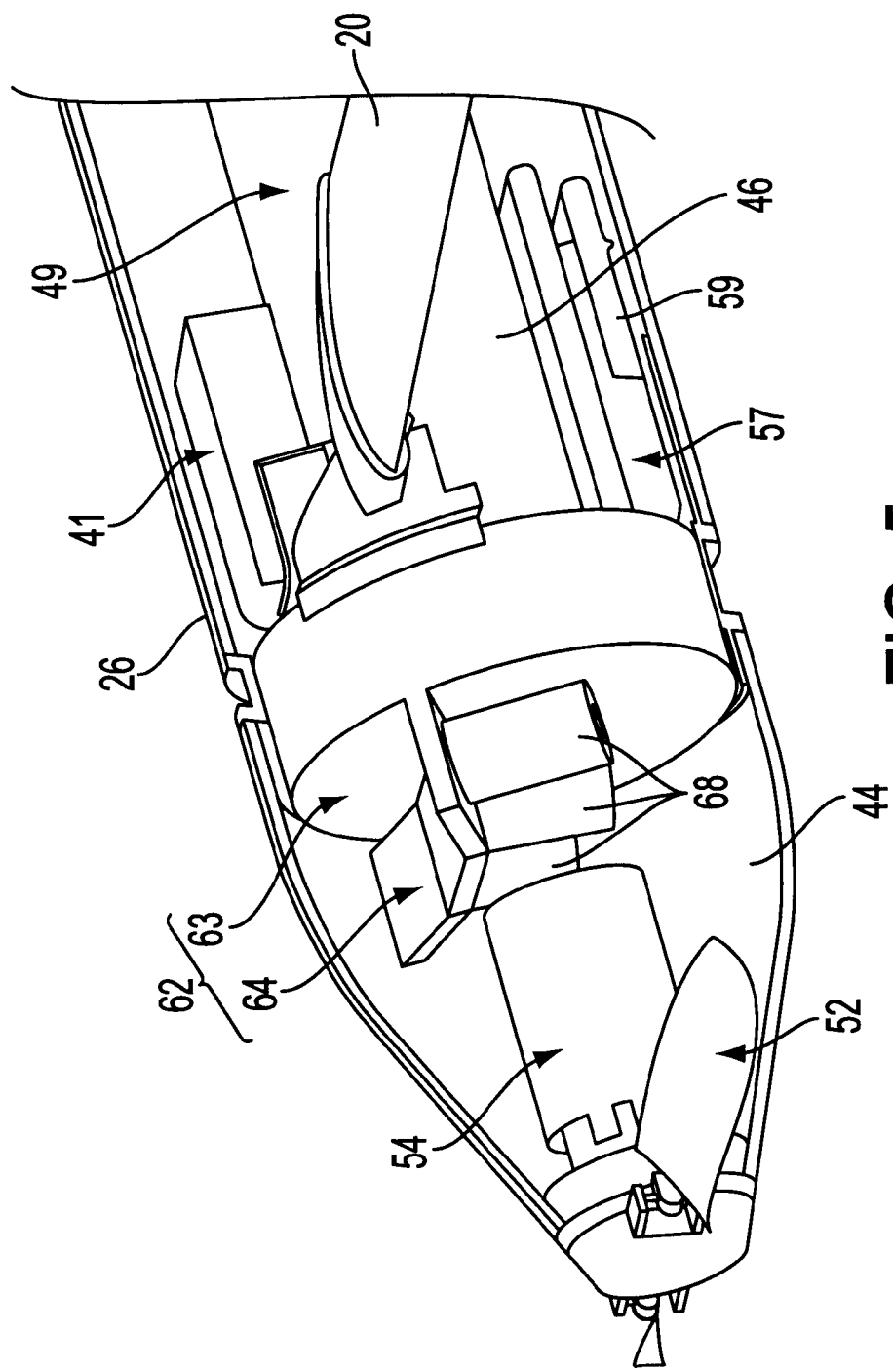
FIG. 5 illustrates a nose section, and a portion of the mid-body section of the flyer.

FIG. 5 presents a more detailed illustration of the nose section 44 and part of the mid-body section 46 of one embodiment of a flyer 14 constructed according to the present invention. An electric propulsion system, including a folding propeller 52 and a brushless DC motor 54, are located at the forward portion of the nose section 44. The electric propulsion system is preferably constructed to be highly reliable and to survive g-loads, so that the system can start up while the flyer is in motion, and while the flyer 14 is at an altitude with low ambient temperature and reduced oxygen. The cruise speed of the flyer 14 is about 65 mph. In one embodiment, the propeller 52 rotates at about 5000 RPM, during a level flight of the flyer at 60 mph. In one embodiment, the propeller 52 has a diameter of 11 inches, and a pitch of 15 inches. The motor 54 has a maximum power of 0.5 HP.

An analog and digital Global Positioning System (GPS) 41 is stored in the forward portion of the mid-body section 46 of the flyer, adjacent the bulkhead 26 and above the foldable wing assembly 20. An Inertial Navigation System (INS) 57 and a flight computer 59 are stored adjacent the bulkhead 26 and under the wing assembly 20.

An integrated imager 62, including imager electronics 63 and imager optics 64, is located behind the motor 54. The imager optics 64 preferably includes four imaging sensors, of which three sensors 68 are electro/optic (E/O), and one sensor is infrared (IR). The three E/O imaging sensor heads 68 are positioned side by side in front of the imager electronics 63, while the fourth IR imaging sensor head is located near the battery. The imager electronics 63 include an image processor and an image transmitter. The imaging distance required for identification of moving targets is about 4000 ft. The image resolution required for identification of moving targets is about 1 ft.

Figure 6:
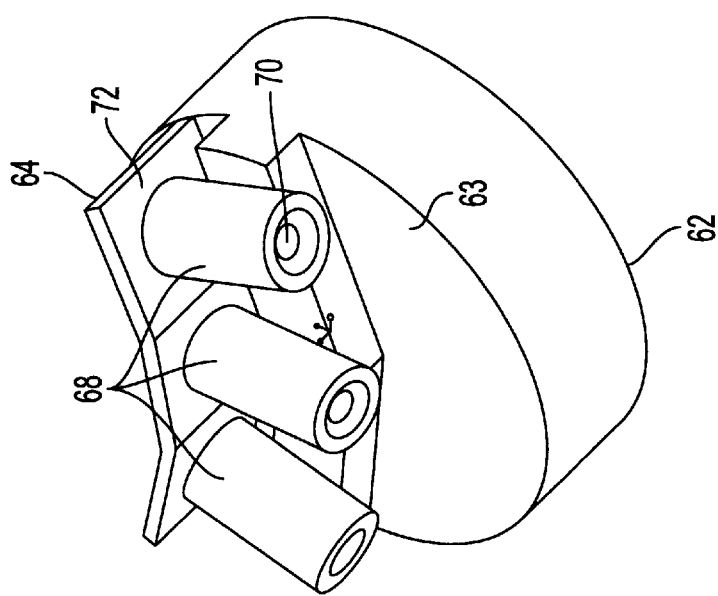
FIG. 6 illustrates an integrated imager for a flyer of the present invention.
Figure 6:
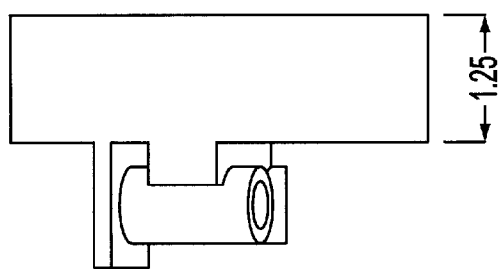
Figure 6:
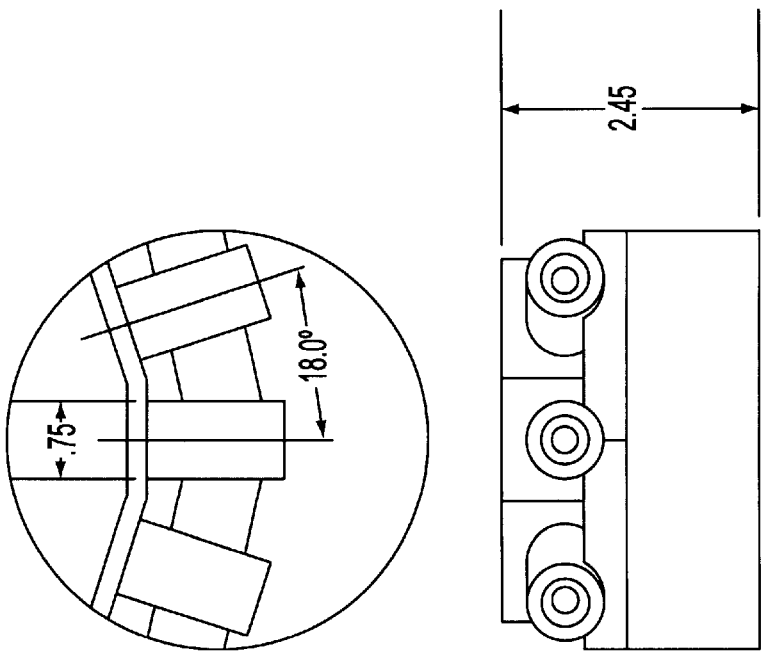

FIG. 6 presents a more detailed illustration of one embodiment of the integrated imager 62, including imaging electronics 63 and the three imaging sensor heads 68. The centerline of the imaging head cluster is coincident with the centerline of the flyer 14. As shown in FIG. 6, the focal length of each imaging sensor head is 33 mm, and the field of vision (FOV) of each imaging sensor head 68 is 19 degrees. The imager charge coupled device (CCD) has 1280×1024 active pixels. Images are captured by taking a series of stills. In one embodiment, the snapshot ground coverage from the flyer 14 is 1024 ft downrange and 3840 ft crossrange, for identification of targets, and 2048 ft downrange and 7880 ft crossrange, for recognition of targets. The flyer 14 takes one still photo from directly above the target position, and at least two snapshots from 30 degrees off vertical. In one embodiment, the identification range does not exceed 4000 ft.

Figure 7:
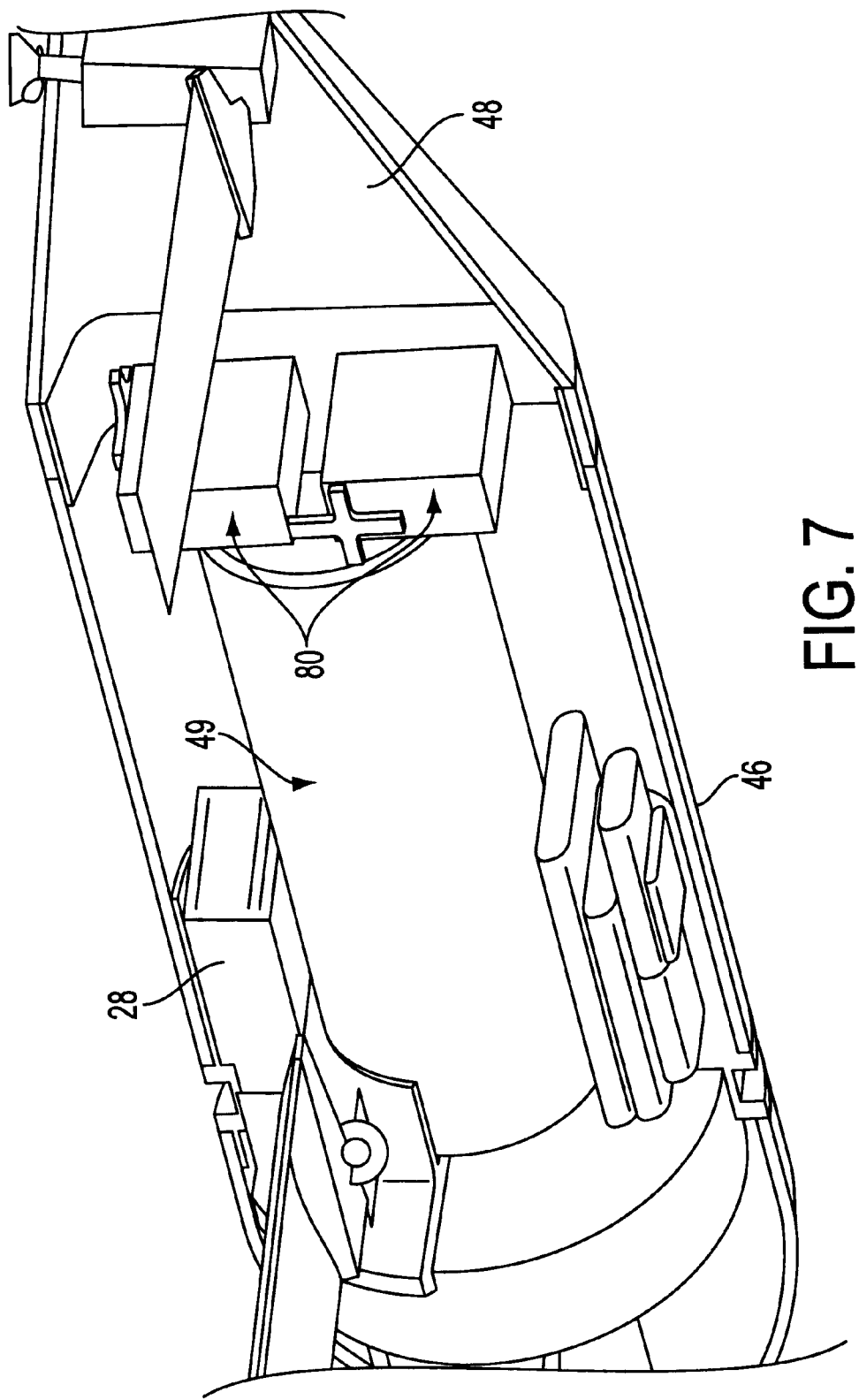
FIG. 7 illustrates a mid-body section, and part of the tailsection of the flyer.

FIG. 7 illustrates one embodiment of the mid-body section 46 and part of the tail section 48 of a flyer constructed according to the present invention. The battery 49 is shown located within the central void region 28 of the mid-body section. The battery 49 is preferably a Lithium oxyhalide (Li/SOCl$_2$) reserve battery, which has a long storage life due to separate storage of the electrolyte. The battery electrolyte is stored independent of the electrodes for long life, eliminating fueling requirements for the flyer 14. The electrolyte is forced into the cells upon high-g projectile firing. The total voltage in the battery is about 32+/−4 volts. The maximum current is about 1 A, and the storage loss is about 3% per year. An aft bulkhead is located between the mid-body section 46 and the tail section 48. Tail servos 80 are located near the aft bulkhead behind the battery.

Figure 8B:
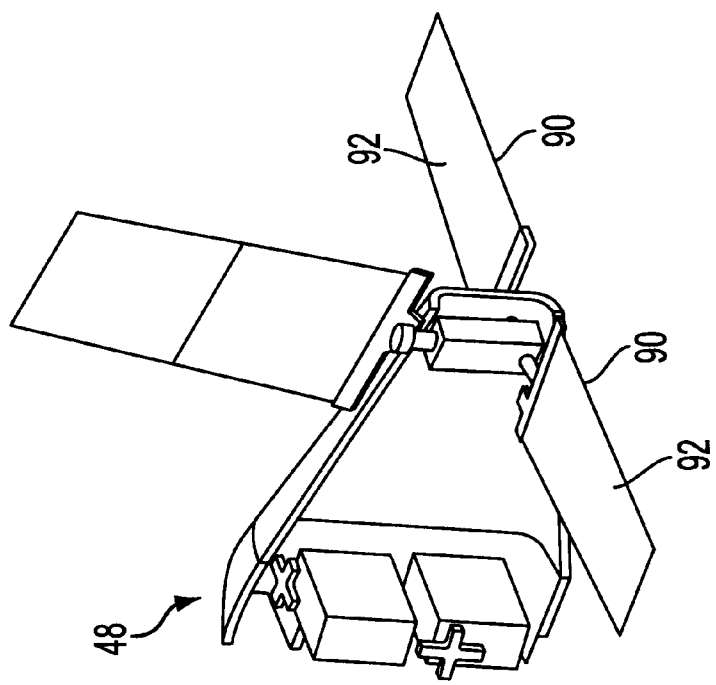
FIGS. 8(a) and 8(b) illustrates a tail section of the flyer, which can be configured in a folded state and in an unfolded, deployed state.
Figure 8A:
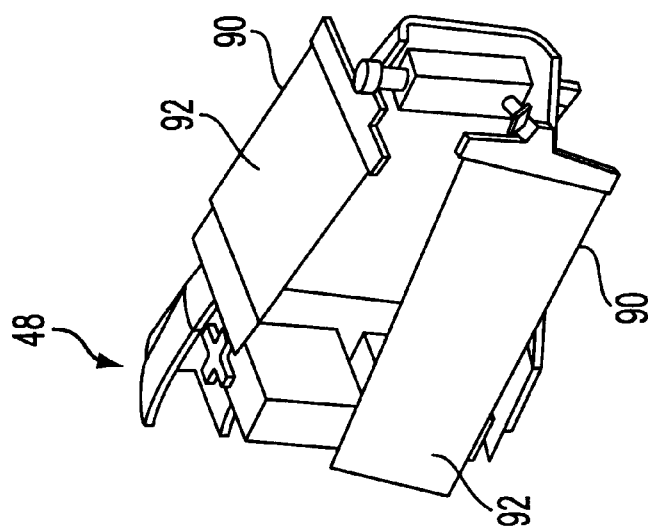

FIGS. 8(*a*) and 8(*b*) provide a more detailed illustration of one embodiment of the tail section 48. The tail section includes a plurality of single fin tails 90, each single fin tail having a tail surface 92. In one embodiment, the plurality of single fin tails 90 form a foldable tail assembly, configurable in a folded state and in an unfolded state. FIG. 8(*a*) shows the single fin tails 90 configured in a folded state, while FIG. 8(*b*) shows the tails in an unfolded, fully deployed state. The tail section has a conventional, inverted tail surface arrangement. The tail surfaces 92 can rotate and lock to effect servo drive. All tail surfaces 92 fold externally.

While the flyer assembly 10 can be used for any operation that utilizes a ballistically launched flyer-in-a-shell, a fundamental application for the flyer assembly 10 of the present invention is visual imaging and identification of moving land targets. Moving target identification was needed in order to avoid civilian casualties in recent conflicts such as the conflict in Kosovo. In the air wars in Kosovo, where ground forces were avoided and targets were too far inland for naval gunfire, the air spotters needed video images of ground target areas. The flyer assembly 10 may also be used for Battle Damage Assessment (BDA), when it is prudent to use UAVs rather than to put airmen at risk.

In the operation of one possible application scenario, a high-altitude, long-endurance system, such as JSTARS, surveys a large conflict area. JSTARS locates potential targets, and reports its data through the JSTARS Common Ground Station. Typical JSTARS data include potential target location, speed, and heading. Once an operational decision is made that target identification is required prior to further action, a command is issued to an artillery battery to load a flyer assembly 10 (i.e. WASP) to the directed coordinates.

Upon loading, the shell 22 containing the flyer assembly 10 is fired to the area of interest. In one embodiment, the artillery launch delivers the shell-and-flyer projectile about 22 km in approximately 1 minute. Typically the apogee of the projectile trajectory is about 50,000 ft. The heavy shroud 12 provides the necessary mass for an optimal ballistic range. While the light weight of the flyer 14 increases the flight endurance of the flyer 14 for a given propulsion system, if the flyer assembly 10 is too light, air resistance slows down the flyer assembly, decreasing the ballistic range of the projectile. On the other hand, if the flyer assembly 10 is too heavy, its weight shortens the ballistic range. By implementing a flyer-in-a-shroud design, the weight of the shroud 12 can be added to the light weight of the flyer 14, in order to optimize the ballistic range. In one embodiment, the unloaded shell weighs about 54.9 lb, while the weight of the shell 22 loaded with the flyer assembly 10 is about 102.6 lb. In one embodiment, the muzzle velocity, i.e. the velocity of the flyer assembly 10 when just coming out of the gun is 2,624 ft/sec. As mentioned earlier, the setback acceleration is approximately 16,000 g.

After reaching a desired ballistic range, the flyer assembly 10 is expelled from the rear of the M-483 by an expulsion charge in the projectile nose. The shroud 12 is designed to bear a 60,000 lbf force of expulsion charge. After expulsion, a two-stage parachute system is used to decelerate the flyer 14, and to fully deploy the flyer 14 by converting the wing assembly 20 from a folded state to an unfolded state.

Figure 9A:
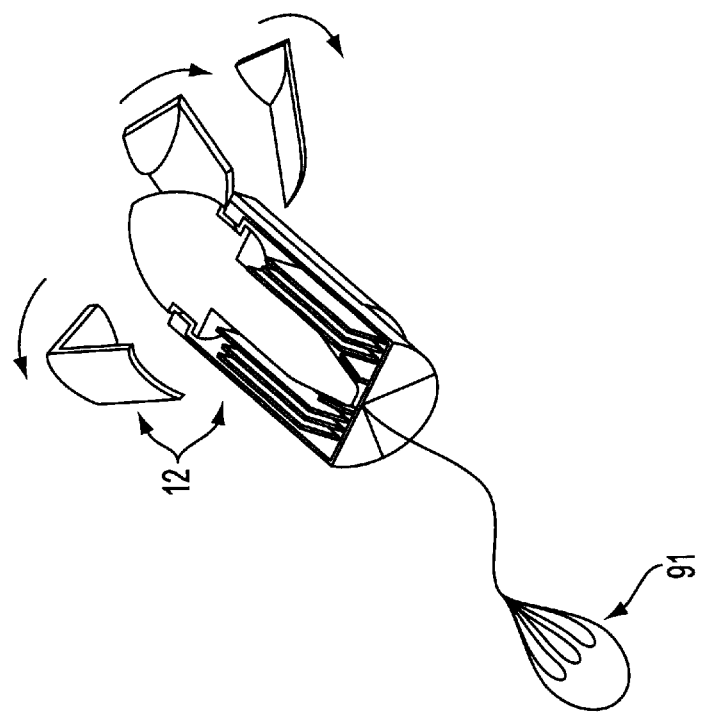
FIGS. 9(a) and 9(b) illustrate a multi-stage transformation from a flyer packaged within the shroud into a fully deployed flyer capable of sustaining aerodynamic flight.
Figure 9A:
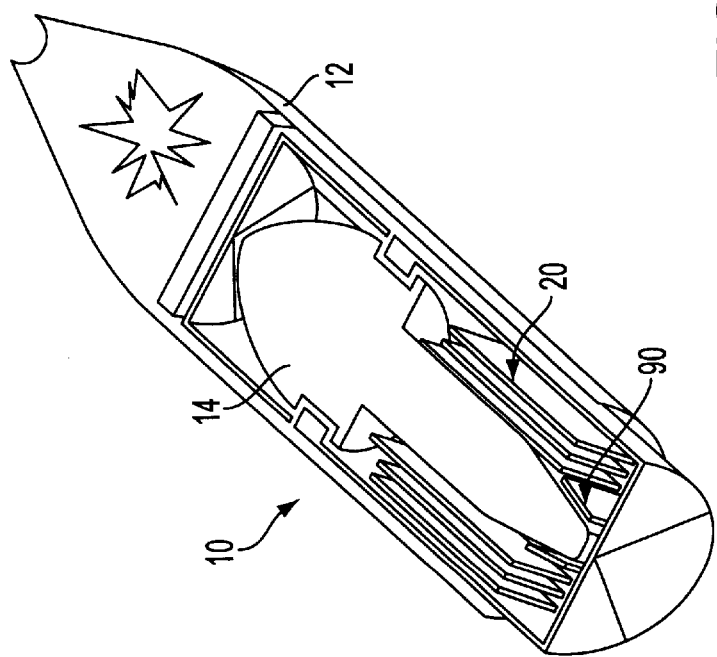
Figure 9B:
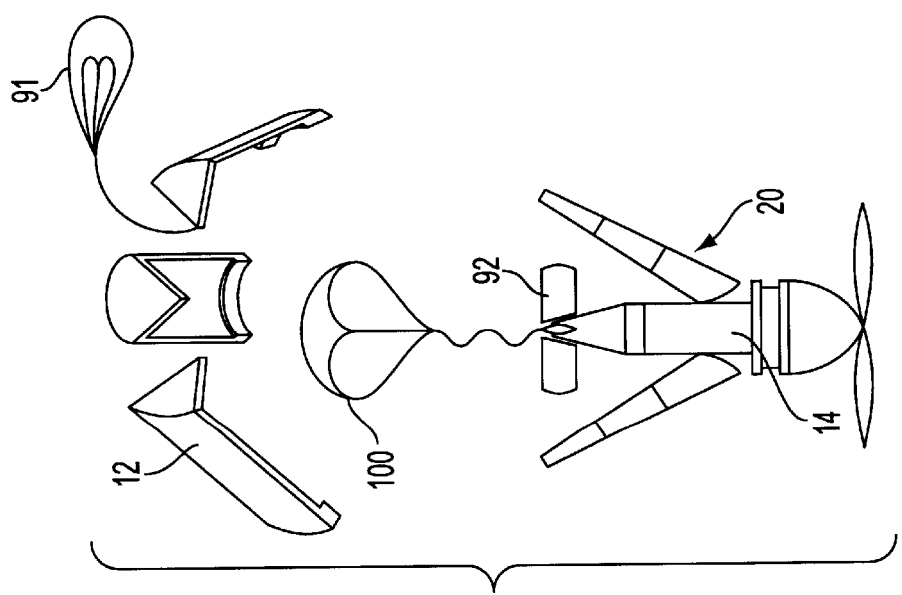
Figure 9B:
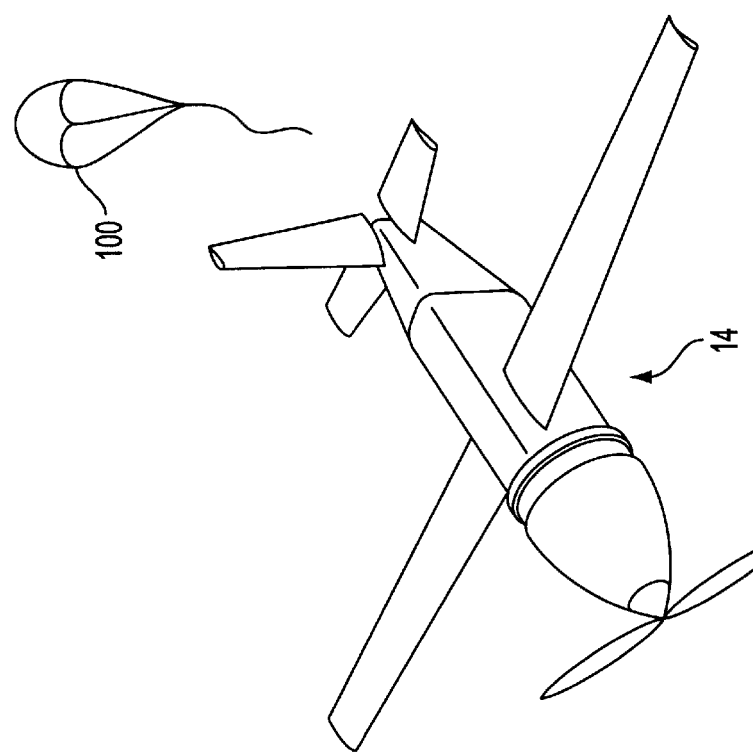
Figure 10A:
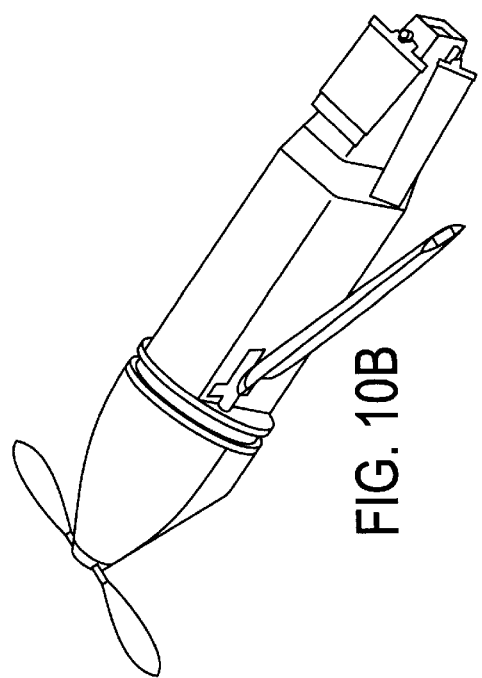
FIG. 10 illustrates a progressive deployment of the wing assembly of the flyer.
Figure 10B:
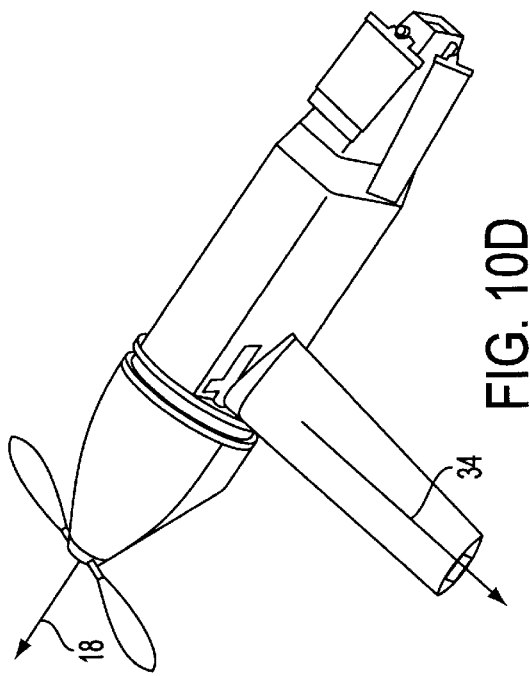
Figure 10C:
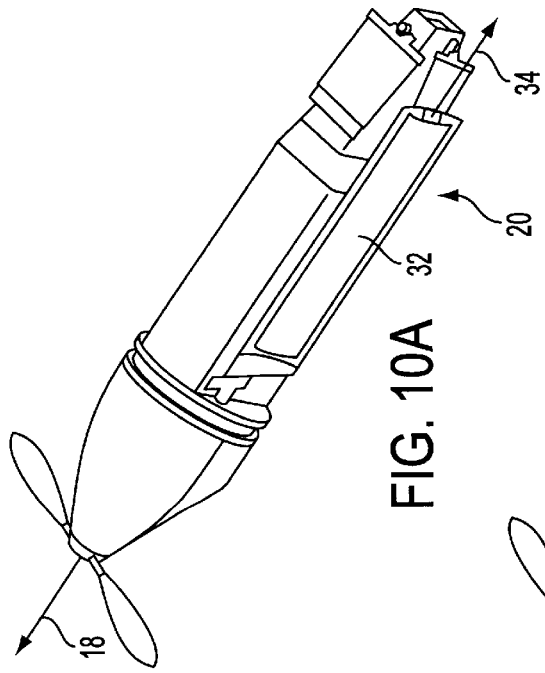
Figure 10D:
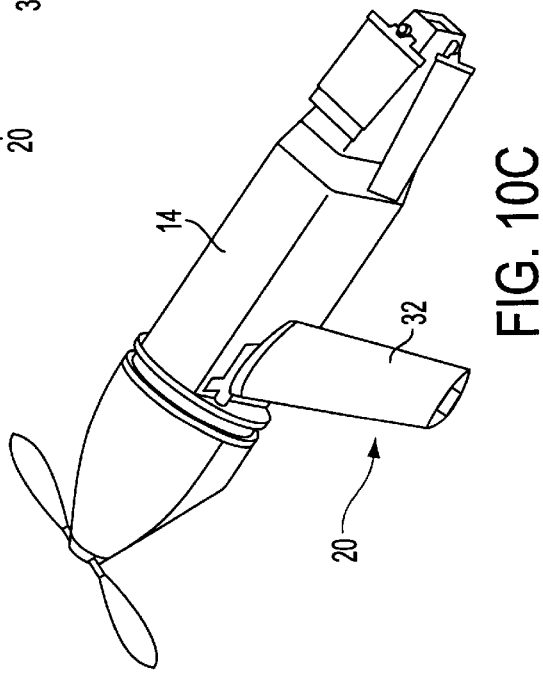

FIGS. 9(a) and 9(b) illustrate a multi-stage metamorphosis from a flyer 14 packaged within the shroud 12 into a fully deployed flyer 14. Step 1 in FIG. 9(a) shows the flyer assembly 10, just after being expelled from the artillery shell by expulsion charges. At this point, the spin rate of the flyer assembly 10 is about 270 Hz, and the speed of the flyer assembly 10 is about 600 mph. The shroud 12 protects the flyer 14 during spinning, preventing the flyer 14 from being torn apart by the high-g rebound loads, and by the high spin. In step 2 shown in FIG. 9(a), a first stage drogue parachute 91 deploys from the shroud 12, to slow and de-spin the flyer 14. The first stage parachute is a high velocity parachute or ballute, and is deployed at a speed of about 900 ft/sec and a rotation rate of about 250–270 Hz. The first stage parachute 91 may be the first stage of a Ram Air Insertion Device (RAID). The spin rate of the flyer assembly 10 is decreased from about 270 Hz to about 10 Hz. The speed of the flyer assembly 10 is reduced from about 600 mph to about 80 mph.

When the flyer assembly 10 reaches a speed of about 80 mph, and a spin rate of about 10 Hz, the shroud 12 is destroyed, as illustrated in step 3 in FIG. 9(b). The shroud 12 is jettisoned by means of small charges embedded within the shroud 12. After the shroud 12 is broken away, a second stage parachute 100 deploys from the flyer 14. The second stage parachute 100 further slows the descent of the flyer 14, and further de-spins the flyer 14. The second stage parachute 100 is a low velocity parachute. The speed of descent of the flyer is reduced from about 80 mph to about 40 mph. The spin rate decreases from about 10 Hz to about 0 Hz. The tail fin surfaces 92 of the flyer 14 are then deployed.

In the fourth and final step, the wing assembly fully deploys, converting from a folded state characterized by a plurality of nested wing segments into an unfolded state characterized by a substantially uninterrupted aerodynamic surface. FIGS. 10(a) to 10(d) illustrate a deployment sequence for the wing assembly 20 of the present invention. As seen from the illustrated sequence, the wing segments 32 make a 90° arcuate trajectory from FIG. 10(a) to FIG. 10(d), while sequentially converting from the When the wing assembly is in the folded state, the span-wise axis 34 of each wing segment 32 is substantially parallel to the flyer axis 18 of the flyer 14, whereas in the unfolded and fully deployed state, the span-wise axis 34 of each wing segment 32 is substantially transverse to the flyer axis 18.

Once the wing assembly 20 is in the unfolded state, the electric motor starts, the flyer 14 stabilizes, and aerodynamic flight of the flyer 14 begins. As described earlier, the flyer 14 can perform at least 30 minutes of continuous flight after deployment. The loiter range of the flyer 14 is typically about 48 km, since the flyer 14 travels for about 0.5 hour at a target land speed of about 60 mph. The loiter altitude is about 4,000 ft. The flight of the flyer 14 is may be controlled by a mission plan that is prepared in the UAV Ground Control Station (GCS). The UAV GCS receives down-linked information from the flyer 14, and serves as the up-link node to the flyer 14. Typically, the range from the artillery unit to the GCS is about 40 km. The communication range from the flyer 14 to the GCS can therefore be up to 88 km. During the initial stage of the controlled flight, the flyer 14 receives the mission plan through a ground communication link. The flyer 14 then executes the mission plan flying between designated points. The mission plan may be updated continuously, as JSTARS supplies updates on target location, speed, and heading. The E/O imaging sensors 68 send video images to the ground. The video images may be sent directly to JSTARS, to the ground operations centers, or to all of these nodes, as required.

Figure 11:
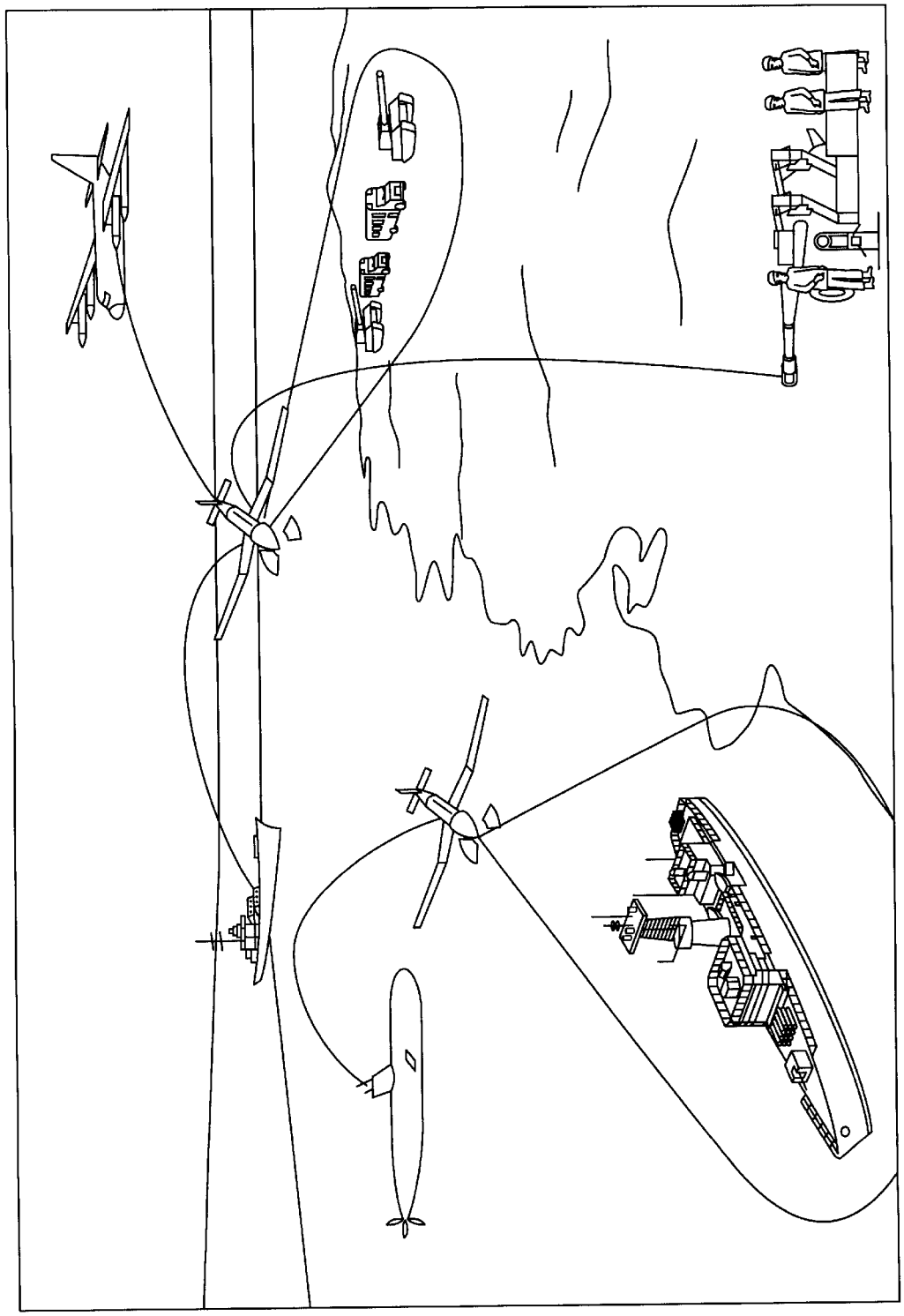
FIG. 11 illustrates possible deployments of the flyer assembly from diverse platforms.

Because of its high-g capability, and because of its capacity to tolerate extreme environments, the flyer assembly 10 of the present invention can be launched from other launch platforms such as Naval guns. The flyer assembly 10 of the present invention can be thus used in the Army, Navy, or the Air Forces, for time-critical missions involving moving targets. For alternate launch platforms, the flyer assembly 10 of the present invention may be substituted, for example, for the munition in the munitions compartments of projectile/missile hybrids such as the Extended Range Guided Munition (ERGM). FIG. 11 illustrates a notional application of the flyer assembly 10 for deployment from diverse air, land, and undersea platforms.

The flyer assembly 10 may also be air-dropped or launched from aircraft weapon pods to extend the vision of, e.g., Forward Air Controllers (FACs). FACs are close enough to see, sense and report ground information, but could be in a danger zone, and would therefore benefit from the WASP capabilities disclosed in the present invention. The FACs could drop the flyer assembly 10 of the present invention and have it fly to an area of interest, while remaining at a safe distance or above cloud cover. The flyer assembly 10 may even be used for civilian purposes, such as disseminating leaflets over selected target areas.

By implementing flyers that can survive cannon launches, the present invention greatly improves the availability of flyers for time-critical missions. In a battlefield environment, situations change extremely quickly so that very fast response with very little planning is an advantage. In order to engage in time-critical missions involving moving ground targets, availability of the assets, including cost, planning time, and maintenance of the assets, and the time it takes to reach the target, are important.

The flyer assembly 10 disclosed in the present invention significantly improves the availability of flyers for time-critical missions. As described earlier, the flyer assembly can be packaged in a standard artillery shell which is distributed to guns in the same manner as existing kill rounds in the inventory. As soon as a decision to deploy a WASP is made, the battery can be notified, and a shell containing a flyer assembly 10 can be loaded and fired to the area of interest. The flyer assembly 10 is thus available when needed, at the point of fire. Time need not be wasted for fueling the flyer 14, since the flyer 14 constructed according to the present invention uses electric propulsion with a g-activated long-storage life battery, as described earlier. The actual flight of the shell takes only one minute for 22 km. The mission plan can be downloaded by the UAV controller while the flyer 14 is in flight. No special takeoff or landing facilities are required. Finally, the target cost for the flyer assembly 10 is only $10,000 in lots of 1000. With such low production costs, the flyer assembly 10 of the present invention can be considered expendable, thus avoiding additional costs of recovering and refurbishing UAVs. Expendability is a logistical advantage for UAVs intended to sense chemical or biological agents, since it makes it unnecessary to return and thus decontaminate the UAVs.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A flyer assembly adapted for launching with, transit in, and deployment from an artillery shell having a central void region extending along a ballistic shell axis, comprising:

A) a jettisonable shroud extending along a shroud axis and positionable within said central void region with said shroud axis substantially parallel to said shell axis;

B) a flyer adapted when in a first state to withstand a launch acceleration force along a flyer axis and adapted when in a second state to effect aerodynamic flight, the flyer in said first state being positionable within said shroud with said flyer axis parallel to said shroud axis and said shell axis, the flyer including:

a) a body member disposed about said flyer axis; and b) a foldable wing assembly mounted to the body member, the wing assembly being configurable in a folded state characterized by a plurality of nested wing segments when the flyer is in said first state; the wing assembly being configurable in an unfolded state characterized by a substantially uninterrupted aerodynamic surface when the flyer is in said second state;

wherein the flyer is adapted for coupling to the shroud so as to maintain a portion of the flyer in tension during an acceleration of the flyer along the flyer axis resulting from the launch.

2. A flyer assembly according to claim 1,
   wherein each wing segment comprises a span-wise axis; and
   wherein when the wing assembly is in the folded state said span-wise axis of each wing segment is substantially parallel to the flyer axis, and
   wherein when the wing assembly is in the unfolded state said span-wise axis of each wing segment is substantially transverse to said flyer axis.

3. A flyer assembly according to claim 1,
   wherein the shroud comprises a support mechanism disposed at an interior surface of the shroud,
   wherein the flyer comprises a bulkhead for coupling to the support mechanism of the shroud, and
   wherein the flyer is adapted to be hung by the bulkhead on the support mechanism of the shroud.

4. A flyer assembly according to claim 1, wherein the body member comprises a central void region, and further wherein the wing assembly is mounted on an outer surface of the body member exterior to the central void region.

5. A flyer assembly according to claim 4, wherein the central void region is adapted to store system energy to be dispensed during an aerodynamic flight of the flyer.

6. A flyer assembly according to claim 5, wherein the flyer is operable to reach a predetermined ballistic range at a predetermined velocity without expending the system energy stored within the flyer.

7. A flyer assembly according to claim 6, wherein the predetermined ballistic range is about 22 km, and the predetermined average ground speed is about 22 km/min.

8. A flyer assembly according to claim 1,
   wherein the body member comprises a nose section, a mid-body section, and a tail section, and
   wherein the bulkhead is disposed at a junction between the nose section and the mid-body section, and
   wherein the mid-body section and the tail section of the flyer are maintained in tension during an acceleration of the flyer along the axis resulting from the launch.

9. A flyer assembly according to claim 1, wherein the flyer assembly is adapted for expulsion from the artillery shell after reaching a predetermined ballistic range.

10. A flyer assembly according to claim 9, further comprising a mechanism for decelerating and de-spinning the flyer assembly subsequent to an expulsion of the flyer assembly from the shell.

11. A flyer assembly according to claim 10, wherein the deceleration mechanism comprises a parachute.

12. A flyer assembly according to claim 9, wherein the shroud comprises a separation mechanism for jettisoning the shroud subsequent to the expulsion of the flyer assembly from the shell and upon a reaching of the expelled flyer assembly of a predetermined altitude.

13. A flyer assembly according to claim 12, wherein the separation mechanism comprises charges embedded within the shroud.

14. A flyer assembly according to claim 1, wherein the flyer is an unmanned air vehicle.

15. A flyer assembly according to claim 1, wherein the flyer assembly is adapted to be launched from a ballistic delivery system.

16. A flyer assembly according to claim 1, wherein the ballistic delivery system is selected from the group consisting of a cannon, an aircraft, a rocket, and a submarine.

17. A flyer assembly according to claim 1, wherein the shroud is substantially cylindrical.

18. A flyer assembly according to claim 1, wherein a weight of the shroud adds to a weight of the flyer so as to provide an optimal ballistic range for the flyer assembly.

19. A flyer assembly according to claim 18, wherein the optimal ballistic range is about 22 km.

20. A flyer assembly according to claim 1, wherein an outermost one of the plurality of wing segments is placed under compression, and all but the outermost one of the plurality of wing segments is placed under tension, during an acceleration of the flyer along the flyer axis resulting from the launch.

21. A flyer assembly according to claim 1, wherein an inner surface of the shroud abuts an outermost one of the plurality of wing segments of the foldable wing assembly, and provides a radial restraining force that counters a centrifugal force arising from a spinning of the flyer assembly, thereby preventing a buckling of one or more wing segments.

22. A flyer assembly according to claim 1, wherein the flyer is constructed from a composite material.

23. A flyer assembly according to claim 1, wherein the flyer is adapted to withstand a set-back acceleration of about 16,000 g along the flyer axis.

24. A flyer assembly according to claim 1, further comprising a foldable tail assembly mounted to the body member, the tail assembly being configurable in a folded state and in an unfolded state.

25. A flyer assembly according to claim 3, wherein the support mechanism comprises a hanger.

26. A method for deploying a flyer, the method comprising:

positioning the flyer within a jettisonable shroud so that an axis of the flyer is parallel to an axis of the shroud;

positioning the jettisonable shroud within a central void region in an artillery shell so that a shroud axis is parallel to a ballistic shell axis;

launching the shell from a ballistic delivery assembly;

expelling the shroud and the flyer from the shell;

jettisoning the shroud; and deploying the flyer so as to configure in an unfolded state a foldable wing assembly mounted to a body member of the flyer.

27. A method according to claim 26, further comprising the steps of decelerating and de-spinning the shroud and the flyer after expelling the shroud and the flyer from the shell.

28. A method according to claim 26, wherein the steps of decelerating and de-spinning the shroud and the flyer comprise the step of deploying a parachute.

29. A method according to claim 26, wherein the step of deploying the flyer comprises the step of configuring in an unfolded state a foldable tail assembly mounted to a body member of the flyer.

* * * * *